May 25, 1926.

A. H. FOGELQUIST

GLARE SCREEN

Filed March 16, 1925

1,585,659

Inventor
Albin H. Fogelquist

By Herbert E. Smith

Attorney

Patented May 25, 1926.

1,585,659

UNITED STATES PATENT OFFICE.

ALBIN H. FOGELQUIST, OF SPOKANE, WASHINGTON.

GLARE SCREEN.

Application filed March 16, 1925. Serial No. 15,799.

My present invention relates to improvements in glare screens for use on automotive vehicles for the purpose of breaking up, by refraction, the rays of light from the headlights or front lamps of an approaching vehicle, for the protection of the driver of the car upon which the device is used. The invention contemplates a glare screen adapted as an attachment to the windshield post or frame of an automobile, or to a similar object at the front of the automobile, and located at the proper focal distance from the seat occupied by the driver of the car, in order that the driver may view the roadway ahead without danger of being dazzled by the brilliant headlights of an approaching vehicle.

The invention consists in certain novel combinations and arrangements of parts involving the use of a slotted plate or panel by means of which the light rays striking the front of the panel or screen are broken up, refracted or diffused by the screen to prevent them directly reaching the eye of the driver.

In the accompanying drawings I have illustrated two forms of the physical embodiment of my invention wherein the parts are combined and arranged in accord with the principles of my invention.

Figure 2:
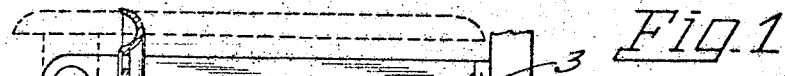
Figure 2 is a vertical sectional view of the screen in position for use and showing in dotted lines the screen turned up out of the way when not in use.
Figure 3:
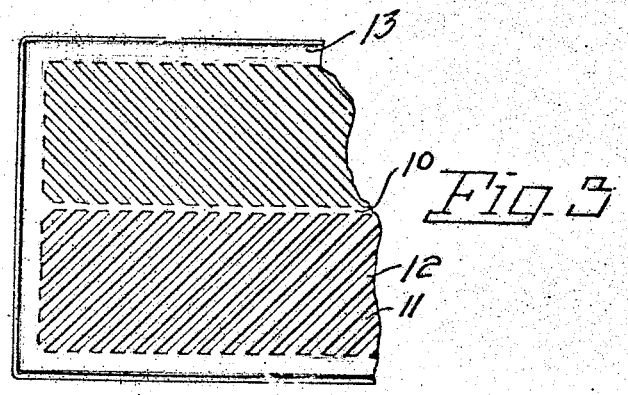
Figure 3 is a front view of a portion of a modified form of light or glare screen.

The device of my invention is preferably attached in horizontal position to the windshield frame or posts as 1 in Figure 2, on a pair of brackets 2, by means of the attaching lugs 3 and screws 3' as seen in dotted lines Figure 2.

The screen is preferably made up of a single sheet of metal of the proper size and shape and stamped in a press or other suitable machine. In the drawings the screen is of oblong shape and of ample length to afford a screen for the eyes of the driver of the car. This panel is fashioned with a concavo-convex reinforcing bead or border 4 extending entirely throughout its periphery in order that the panel may be comparatively light in weight and yet sufficiently rigid to insure durability and maintain its proper form. A pair of attaching lugs 5 are affixed at the opposite ends or top corners of the panel and hinge pins 6 in the bracket 2 form pivots for the screen when it is to be turned down to approximately vertical position for use, or turned up to approximately horizontal position when not in use. Clamp nuts 7 on the threaded ends of the pins or bolts 6 are utilized as friction devices to hold the screen in its desired angular position.

Figure 1:
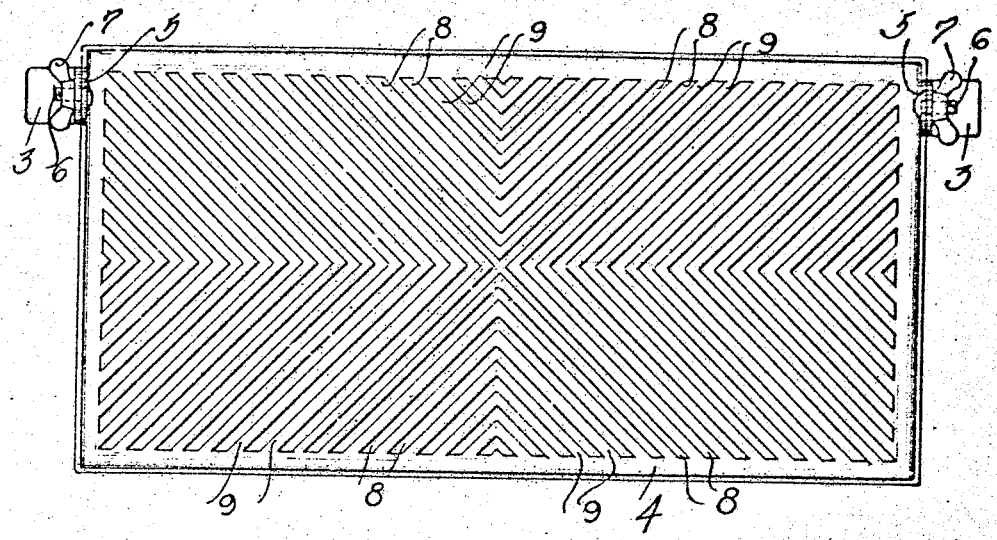
Figure 1 is a front or exterior view of a light screen or glare screen involving my invention.

The panel or plate is fashioned of a single piece of material, and in Figure 1 four series of slots 8 and alternating bars 9 are arranged to form four separate and equal areas covering the panel.

The alternating parallel bars and slots in each series are of equal width and the slots and bars in the respective areas are arranged on parallel oblique lines which extend from the longitudinal central axis of the panel obliquely in opposite directions above and below the central axis, and to the right and left sides of the vertical axis of the panel. The slots and bars are thus arranged on lines oblique to the four diametrical lines of the screen, or lines converging on the diametrical lines of the screen. This formation of the slots and bars is effective for the purpose of receiving the light rays that strike the front of the screen and for refracting or diffusing and breaking up the light rays before they can pass through the screen and reach the eye of the driver on direct lines. Thus the driver may with impunity peer or look directly through the screen at the headlight of an approaching car without danger of being dazzled by the brilliant light or light rays.

In Figure 1 a longitudinally extending central bar 10 is fashioned in the panel from which radiate two series of alternating slots and bars 11 and 12 respectively that extend therefrom in opposite directions on oblique lines, or on diagonal lines with respect to the longitudinal or axial line of the bar, to the outer bead or border 13.

The material of which the screen is fashioned is preferably opaque, such as sheet metal, but other material, such as semi-opaque material may be used if desired. As disclosed in the drawings the lines of the slots and bars are located on approximately 45° angles, but other angles may be used for the converging refracting members.

Having thus fully described my invention what I claim as new and desire to secure by Letters Patent is—

1. A glare screen comprising a panel having a plurality of series of alternating slots and bars extending obliquely in opposite directions from a central axis of the panel to its edges.

2. A glare screen of opaque material comprising a panel having a plurality of parallel alternating slots and bars of equal width extending obliquely in opposite directions from a central axis to its edges.

3. A glare screen comprising a panel having a plurality of series of alternating slots and bars extending in opposite oblique directions and intersecting the longitudinal and vertical axis of the panel.

4. A glare screen comprising a single sheet of metal having a concavo-convex border and a plurality of series of alternating slots and bars of equal width extending obliquely in opposite directions and intersecting at the longitudinal and vertical axis of the panel.

In testimony whereof I affix my signature.

ALBIN H. FOGELQUIST.